United States Patent [19]

Blake et al.

[11] 4,276,872
[45] Jul. 7, 1981

[54] SOLAR SYSTEM EMPLOYING GROUND LEVEL HELIOSTATS AND SOLAR COLLECTORS

[75] Inventors: Floyd A. Blake, Littleton, Colo.; Lynn L. Northrup, Jr., Hutchins, Tex.

[73] Assignee: Atlantic Richfield Company, Los Angeles, Calif.

[21] Appl. No.: 960,307

[22] Filed: Nov. 13, 1978

[51] Int. Cl.³ .................... F24J 3/02; G01J 1/20; G03B 21/00
[52] U.S. Cl. .................. 126/425; 126/438; 250/203 R; 353/3
[58] Field of Search .............. 126/425, 424, 451; 353/3; 250/203 R

[56] References Cited

U.S. PATENT DOCUMENTS

| | | | |
|---|---|---|---|
| 1,951,404 | 3/1934 | Goddard | 126/438 |
| 3,892,433 | 7/1975 | Blake | 126/451 |
| 3,905,352 | 9/1975 | Jahn | 126/425 |
| 3,906,927 | 9/1975 | Caplan | 126/425 |
| 3,924,604 | 12/1975 | Anderson | 126/438 |
| 4,013,885 | 3/1977 | Blitz | 126/425 |
| 4,031,385 | 6/1977 | Zerlaut et al. | 250/203 R |
| 4,034,735 | 7/1977 | Waldrip | 126/425 |
| 4,061,130 | 12/1977 | Gonzalez | 126/425 |
| 4,102,326 | 7/1978 | Sommer | 126/425 |
| 4,146,784 | 3/1979 | Yekutieli | 126/425 |

*Primary Examiner*—James C. Yeung
*Assistant Examiner*—Daniel O'Connor
*Attorney, Agent, or Firm*—Wofford, Fails & Zobal

[57] ABSTRACT

This specification discloses an improvement in a solar system having one or more collectors for receiving and using radiant energy from the sun and at least one and preferably a plurality of respective reflector means for reflecting the radiant energy onto the collectors. The improvement is characterized by having towerless collectors and towerless reflectors that are disposed at ground level or substantially the same level, to eliminate the major expense of a collector tower, which is inefficient and nonfunctional in a solar system.

Also disclosed is a complete system, or combination, for generating power employing solar energy and the improvement delineated above; as well as structural details of preferred arrangements and equipment.

5 Claims, 8 Drawing Figures

SOLAR SYSTEM EMPLOYING GROUND LEVEL HELIOSTATS AND SOLAR COLLECTORS

BACKGROUND OF THE INVENTION

1. Field of the Invention

This invention relates to solar systems employing reflectors for reflecting the radiant energy onto one or more collectors. More particularly, this invention relates to an improvement in a solar system having a plurality of reflectors and collectors in which the nonfunctional expense of towers and the like is reduced without sacrificing precision and efficiency.

2. Background of the Invention

The prior art has seen the development of a wide variety of systems for producing useful work. As some of the systems, such as nuclear fission, suffer from bad publicity, there is increasing emphasis on the use of solar energy and the like. The systems for using this solar energy are referred to as solar systems. These systems have taken a wide variety of forms ranging from the photovoltaic cells that convert the radiant energy directly into electrical current, such as used in space probes, space vehicles and the like; to the more mundane systems converting the energy to heat for heating of fluid for use in generation of power. Regardless of which system is employed, it is generally conceded to be beneficial to employ a concentrating principle in which the sun's radiant energy from a much larger area than the collector per se, is directed, or focused, onto the collector that uses the radiant energy.

In typical installations heretofore, the collector was mounted on an expensive tower or the like that was non-functional and was a major item of expense. The reflectors were spaced thereabout for directing the radiant energy onto the collector on top of the tower. Heretofore it has been axiomatic that the tower in excess of 100 feet or more has been required, where three or more rows of the reflectors were employed about the tower for directing the radiant energy onto the collector.

As described in our co-pending patent application "SOLAR SYSTEM HAVING IMPROVED HELIOSTAT AND SENSOR MOUNTINGS," U.S. Ser. No. 953,469, filed Oct. 23, 1978, the descriptive matter of which is incorporated herein by reference for details that are omitted herefrom; there was disclosed the prior major expense of having to have the reflectors mounted on one post and the sensors mounted on another post, both of the posts being deeply embedded into the earth's surface such that they were firmly anchored and resisted receiving minor surface movements that were independent of each other. In that patent application there was disclosed the improved co-mounted reflector and sensor on a single post to eliminate that nonfunctional and inefficient expense.

Thus it can be seen that the prior art has not been totally satisfactory in providing a solar system that did not require inefficient and nonfunctional major expenses, such as the tower for the collector or the double support structures for the respective heliostat and sensors. Also, the prior art did not provide a totally satisfactory solar system in which the respective ground level mounted heliostats and collectors in their respective predetermined arrays, could be serially connected together to incrementally and cumulatively heat a circulated fluid such that the heat was ultimately available at potential levels feasible to produce power or the like with conventional methods and apparatus.

SUMMARY OF THE INVENTION

Accordingly, it is an object of this invention to provide a solar system that is more economical than the prior art systems by eliminating the nonfunctional and inefficient major expense items without sacrificing efficiency.

It is a specific object of this invention to provide a solar system in which there is employed a plurality of collectors and their respective heliostats for maximizing the use of radiant energy from a large surface area in a combination system employing sensors for maximizing the reflected energy and a serially connected arrangement wherein a circulated fluid is heated above the temperature required to generate steam or the like such that the heat is at a potential readily employable in a steam generating system to produce steam for generating power.

These and other objects will become apparent from the descriptive matter hereinafter, particularly when taken in conjunction with the appended drawings.

In accordance with one embodiment of this invention, there is provided an improvement in a solar system, or combination, located on the surface the earth and exposed to the sun and including at least one receiver collector for receiving and using the radiant energy from the sun and at least one reflector means for reflecting radiant energy from the sun onto the collector. The term "collector" is employed herein as synonymous with the term "receiver" as employed in solar central receiver technology. The improvement comprises having the collector a towerless collector that is disposed at substantially the same level as the reflector means and having the reflector means at least one towerless heliostat that is disposed at substantially the same level as the collector onto which it reflects the radiant energy; the heliostat being movable to maximize its reflected energy onto the collector. Preferably, there are a plurality of collectors each having their own plurality of heliostats arranged in an array of two rows. Still more preferably, the respective heliostats and sensors are co-mounted on a single support structure to further minimize the nonfunctional costs, just as the towerless construction eliminates the nonfunctional cost of the tower for the collectors.

In accordance with another embodiment of this invention, there is provided a solar system, or combination, for using solar energy comprising a power generating means that includes a steam powered prime mover; steam generating means and accessories for generating the steam for powering the prime mover; fluid storage means for storing a heated fluid and the heat exchanged return fluid, respective fluid circulating means for circulating the fluid through the collectors to be heated and through the steam generating means for transferring the heat to generate steam; a plurality of solar collectors for collecting the radiant energy and using it to heat the fluid; the solar collectors being connected together in a series such that the temperature of the fluid is raised progressively higher as it passes through respective collectors until a desired temperature greater than the boiling point of water at the pressure in the steam generating means is reached; the collectors being towerless collectors that are disposed at substantially the same levels as their respective heliostats; and the plurality of heliostats for each of the collectors, the heliostats being movable to maximize the radiant energy reflected onto its collector; the heliostats being towerless and disposed at substantially the same level as their respective collectors. In this embodiment, the same preferable features of the two row arrangement of the heliostats and the co-mounting of each sensor and heliostat on a single pole are employed.

DESCRIPTION OF PREFERRED EMBODIMENTS

In one embodiment of this invention it is immaterial whether the collector be of photovoltaic cells for converting the radiant energy directly to electricity or converting the radiant energy to heat, as for heating the fluid that will be used ultimately in the generation of power. The latter application is easily understood and this invention will be described in this context.

Figure 1:
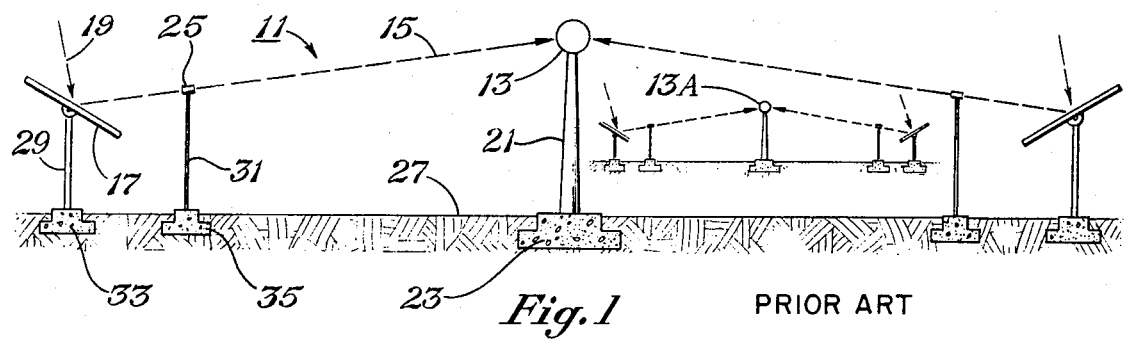
FIG. 1 is a partial side elevational view, partly schematic, showing the prior art arrangement of collectors, reflectors and sensors and their respective supporting structures.

Referring to FIG. 1, the solar system 11 includes a collector 13 for receiving and using the radiant energy from the sun, shown by the ray 15. The solar system 11 also includes at least one reflector means 17 for reflecting the sun's radiant energy, shown by ray 19, onto the collector 13. Ordinarily, in the prior art, the collector 13 was supported on a tower 21 to facilitate receiving the radiant energy from a plurality of the reflector means 17 spaced about the collector 13. For example, where a plurality of three or more rows of the respective reflectors were employed, the tower 21 was at least 100 feet high, or higher, usually about 200 feet high.

In the prior art, the collector 13 could have been a steam generator for heating water to produce steam; or photovoltaic cells to produce electricity; or the like. Where the water was converted to steam, it was used in passing through turbines for generating electricity by rotating generators. Alternatively, as in one embodiment of this invention, the collector 13 may absorb the radiant energy, convert it to heat for heating an oil or other high boiling liquid that will be passed in heat exchange relationship with the water to generate the steam in a steam generator. How the collector 13 uses the radiant energy is relatively immaterial in one aspect of this invention.

The tower 21 had to be structurally adequate to hold the collector 13 against the ambient winds and the like. Thus, the tower 21 was inordinately expensive because of its height and structural requirements. Moreover, this expense was nonfunctional and inefficient from the standpoint of the cost of the whole system. The cost of the collector depended to a large measure on the temperatures that were generated in the collector. For example, temperatures as high as 1500° F. (degrees Fahrenheit) (860° C.) were generated in some designs; and required expensive high temperature metals to hold the pressure and temperatures. Thus, it can be seen that these prior art systems were expensive and much of the expense was unwarranted and nonfunctional.

It is ordinarily desirable, when the temperature is to be in excess of a few hundred degrees Fahrenheit, to try to maximize the radiant energy absorbed by the collector. In such instances, respective sensors 25 are disposed intermediate the reflector means 17 and the target collector 13. The sensors 25 detect and control the alignment of the reflected beam. The sensors may comprise any of those commercially available. It has been found advantageous in this invention to employ dual tube sensors having photovoltaic cells arranged in matched pairs at the base of an elongate tube. The open end of the tube faces directly into the reflector means 17. As long as there is uniform lighting on the cell surfaces, the cells are matched and no error signal is generated. Once the sun moves such that there is non uniform lighting or shadowing of one or more of the cells, an error signal is generated, causing the reflector means to be positioned at a new angle, aligned with the reflector-collector vector to effect best focusing of the sun's rays onto the collector 13. As will be appreciated, it is critical that the sensor 25 always be correctly and carefully aligned with the center of the reflector means 17 and the target 13.

Consequently, in the prior art, the sensor 25 was firmly mounted in the surface 27, as was the reflector means 17. Expressed otherwise, the support structures 29, 31 and foundations 33, 35 were both firmly anchored sufficiently deep that both the sensor 25 and the reflector means 17 received the same movements and there were no spurious surface movements received by either one alone. Ordinarily, each supporting structure 29 and 31 comprised relatively large steel posts designed to resist movement by ambient winds and the like. Respective foundations 33 and 35 were formed of concrete and penetrated into the subsurface layers of the earth deeply enough to resist spurious movement of the surface layers, as from expansion of clays or the like when wet by rain.

It is believed helpful to build the descriptive matter in this invention from the simple elements, such as the heliostat and sensors, to the subsystem for which they are arrayed to reflect the radiant energy onto the respective collectors and then into the total combination including both a charging loop for heating the liquid to be circulated and a discharging loop for using the heat stored in the liquid to generate steam to run a power generating facility.

Figure 2:
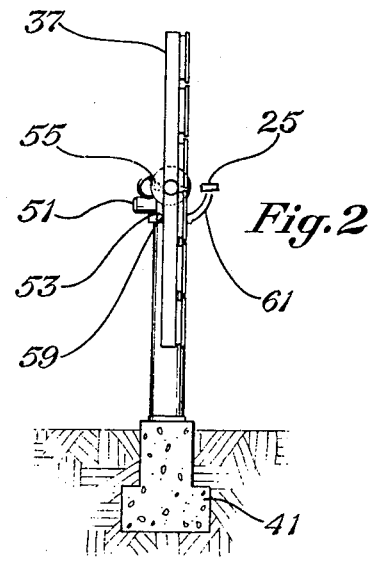
FIG. 2 is a side elevational view of an improved mounting of the heliostat and sensor in accordance with one aspect of this invention.
Figure 3:
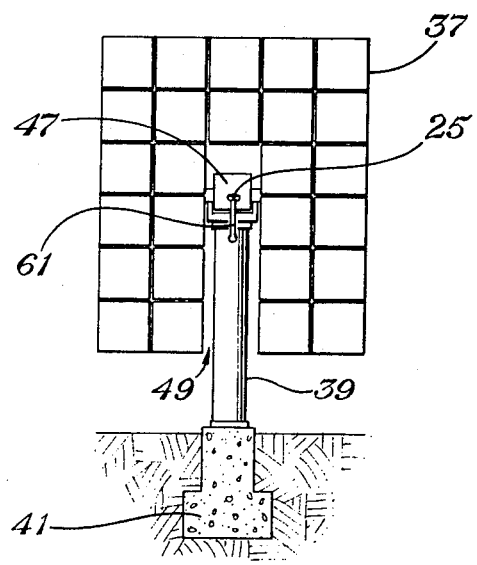
FIG. 3 is a front elevational view of the improved mounting of FIG. 2.
Figure 4:
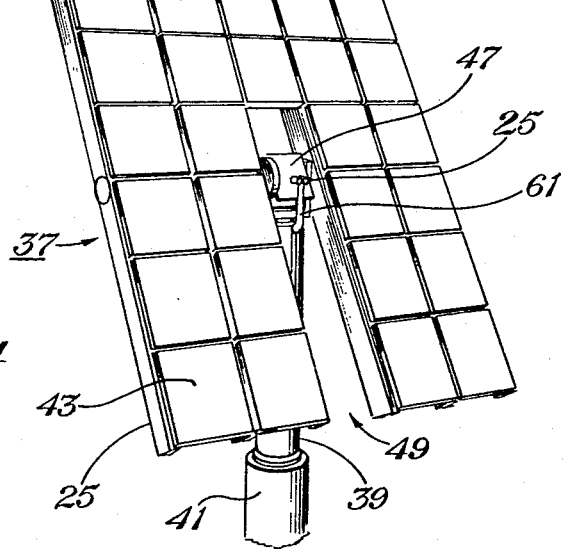
FIG. 4 is partial perspective view of the improved mounting of FIG. 2 in operating position.

Referring to FIGS. 2-4, there is illustrated, in accordance with an embodiment of this invention, the reflector means 17 in the form of heliostat 37 with both it and the sensor 25 being carried by the dual purpose supporting structure, or post, 39. The post 39 is, in turn, carried by the foundation 41. Ordinarily, a plurality of heliostats are employed for reflecting the radiant energy onto a given respective collector 13. The respective heliostats may have any suitable dimension and form. For example, the heliostat may comprise an arcuate reflector means, such as a mirror, to convert the substantially parallel rays from the sun into focused rays that converge on the collector 13. As illustrated, each heliostat is about 24 feet (9.7 meters) tall and about 20 feet (6.1 meters) wide on each single post structure. Focusing is obtained by aligning a plurality of relatively small; for example, four feet by four feet (1.2 meters by 1.2 meters) flat facets into a Fresnel approximation of a spherical concentrator. Each facet has a reflecting surface of a mirrored glass plate for utmost reflectivity. The mirroring may be of conventional design, such as aluminum or silver. Second surface silvering has proved to be the most durable and best reflective material found. The making of the individual flat facets involves only state of the art technology and need not be detailed herein.

As can be seen in FIG. 4, the illustrated facets 43 are arranged in rows and columns on the heliostate and are supported by structural elements 45 in a unitary array of 26 facets. The heliostat 37 has a central reflector 47. The heliostat 37 has a slot 49 below the central reflector 47 so as to be pivoted through a limited arc without hitting the post 39 or with connected elements such as the co-mounted sensor. The heliostat 37 is light in weight. Accordingly, the structural elements are preferably formed of a light weight metal such as aluminum, magnesium, or the like, although steel is frequently employed because of its high strength. The facets 43 are affixed to the structure element by any suitable means, as by bonding or the like. Preferably, the reflecting area is maintained at or near the maximum.

As illustrated, the heliostat 37 is movable pivotally about a horizontal axis through the central reflector 47 to accomodate, primarily, the daily path of the sun. If desired, the heliostat 37 also may be radially movable about a vertical axis passing through the central reflector 47. The radial movement is through a limited arc to accomodate the 23½ degrees variance between the sun's path during the different seasons.

The means for moving the heliostat to maximize the radiation towards the collector 13, includes a motor 51 and a worm gear drive 53, serving as an elevation drive means for pivoting the heliostat about its horizontal axis through the central reflector 47. The worm gear acts on the circular pinion 55 in attaining and holding a desired angle. The worm gear also serves as a braking means so as to resist movement of the heliostat once a given angle is obtained.

Figure 2A:
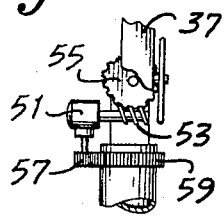
FIG. 2a is a side elevational view showing greater details of a drive mechanism.

To rotate the heliostat through a limited arc about the vertical axis through the central reflector 47, a suitable motor, gear reducer and rack 57, FIG. 2a, is employed, engaging a circular pinion 59 for effecting the rotation. The respective motors, worm gear drives, gear reducers, are all well known and are conventionally available so need not be described in detail herein.

With respect to the foregoing, it is sufficient to note that the slot 49 enables the heliostat to be pivoted or rotated through its limited arc without striking the sensor 25 or its cantilever mounting member 61.

Specifically, the sensor 25 is a dual tube sensor such as described hereinbefore employing two sets of photovoltaic cells each with the cells matched to balance each other when each are receiving the same intensity of light. In the event that there is a moving of the sun without corresponding movement of the heliostat, one of the cells suffers a loss of intensity. Consequently, an error signal is generated that causes the motor to pivot the heliostat 37 to reestablish proper alignment of the reflected beam and achieve a uniform of distribution of light over the photovoltaic cells. The respective cell of a matched pair indicates the nature of the correction to be made; for example, greater tilting of the heliostat. The use and connection of the sensor, controls, motor drives is conventional and need not be delineated in detail herein. The conductors from the sensor 25 are usually run interiorly of the cantilever mounting member 61.

The sensor 25 is carried by the cantilever mounting member 61; which in turn, is affixed, as by welding, to the post 39. The cantilever mounting member 61 is structurally adequate to retain the sensor 25 in place against ambient winds or the like. When the conductors are run interiorly of the member 61, it is tubular with a passageway through its interior. Otherwise, member 61 can be of any desired shape. Preferably, both the cantilever mounting member 61 and the sensor 25 resist destructive effects of weather such as, the destructive effects of sun, rain, ice or the like. This cantilever mounting member 61 may be affixed by any suitable means to the post 39 as long as it is structurally adequate to move in unison with the post 39 and heliostat 37, responsive to outside forces such as wind or the like. It is readily apparent that, as closely mounted as the sensors are to the heliostat, small movements are reflected as large movements of the reflected rays by the time the radiant energy is at the distance of the collector 13.

The heliostat sensor assembly will survive earthquake environment experienced in the continental United States. Reattainment of performance following earth movement is achieved with minor aiming adjustments. The mirrors are readily maintained because of the flat unstressed shape of the glass.

Figures 5, 7:
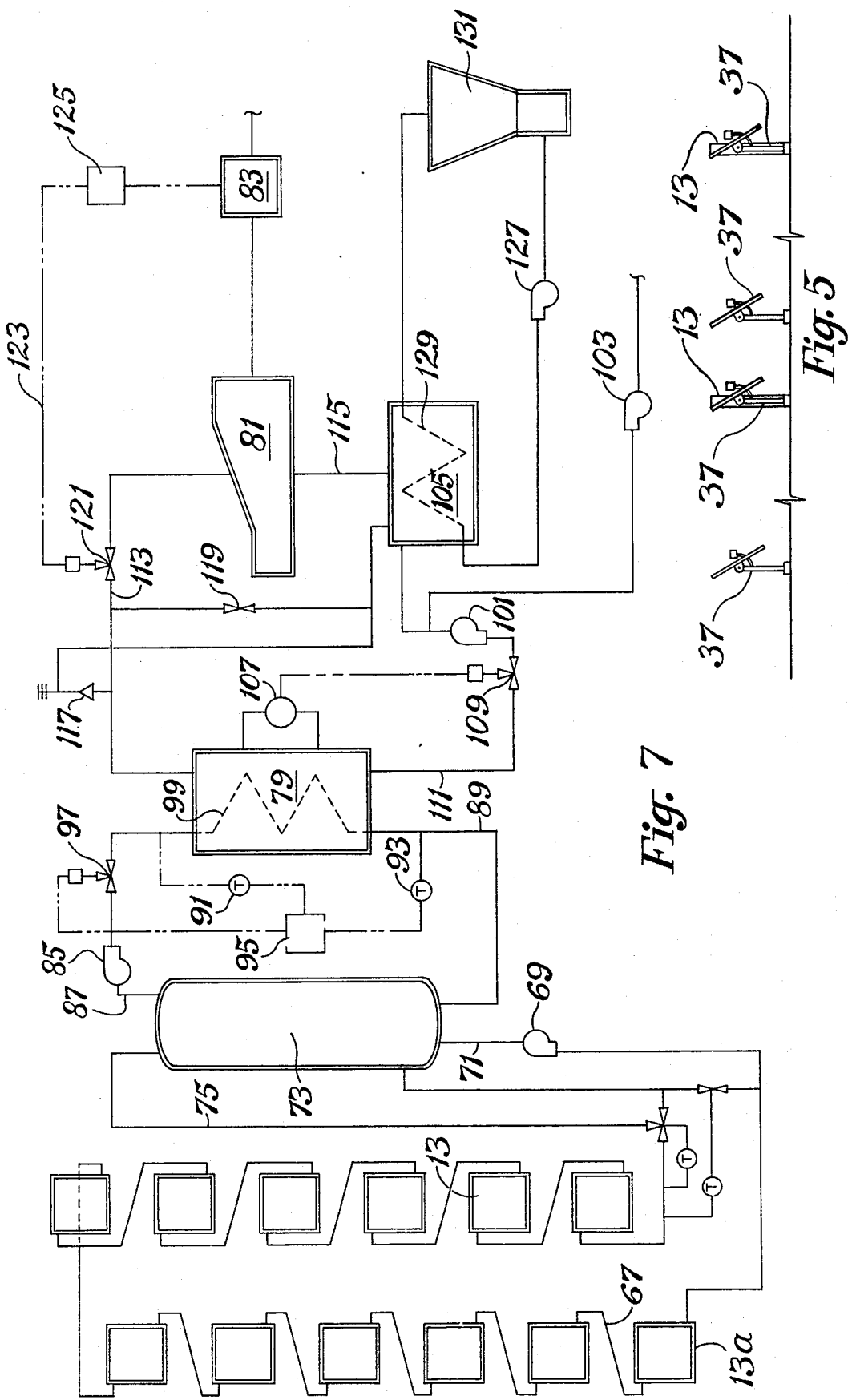
FIG. 5 is a partial side elevational view, partly schematic, showing the present arrangement of collectors reflectors and sensors in accordance with the improvement of this invention.
FIG. 7 is a schematic drawing showing the combination, or solar system, in accordance with the embodiment of FIG. 6.
Figure 6:
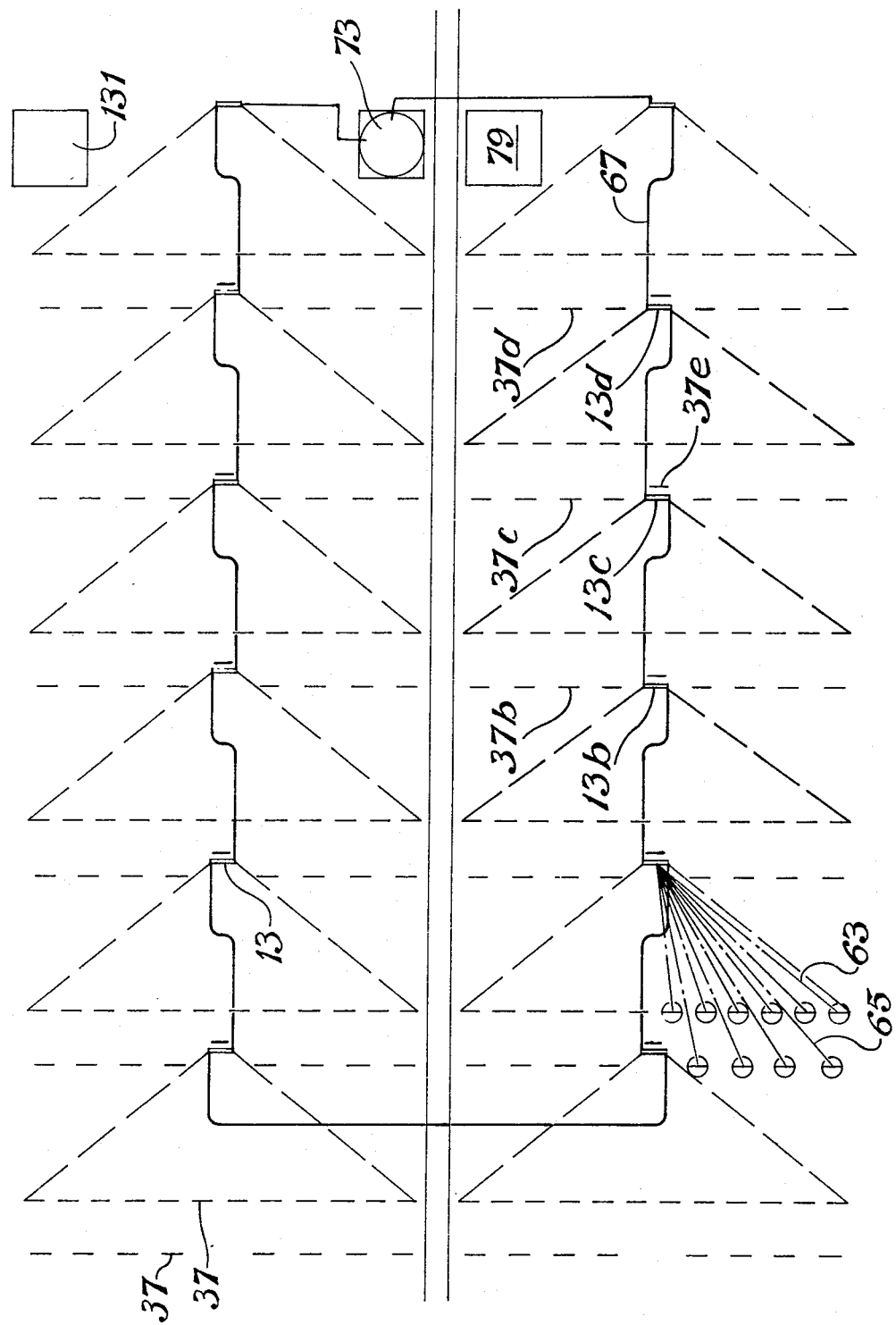
FIG. 6 is a partial plan view, partly schematic, showing the arrangement of collectors, reflectors, sensors, storage tank and accessories of a portion of one embodiment of this invention.

In accordance with this invention, the respective heliostats 37 are mounted in rows angled to reflect toward their respective collector 13, as can be seen in FIGS. 5 and 6.

In the illustrated embodiment, the respective heliostats are towerless reflectors that are mounted at substantially the same level as the respective collectors 13. The respective collectors 13 are also towerless collectors that are mounted at substantially the same elevation as the respective heliostats. While the respective heliostats and collectors may be mounted on the top of the surface and may follow the contour of the surface, the respective elevations will not differ by a distance of greater than plus or minus 25 feet from the horizontal axis of the center of the respective collector 13 and heliostat 37. This is in contrast to the prior art where the tower structures required for the collectors was in excess of 100 feet. As can be seen in FIGS. 5 and 6, the respective heliostat 37 are arranged in two rows with respect to their respective collectors 13. The front row of the heliostats are closest to the collector 13. The second row of heliostats are farther away from the collector 13 and the individual heliostats are offset so as to reflect between the front row heliostats and onto the reflector 13. This arrangement is illustrated by the respective lines 63 and 65 from the respective front row and rear row heliostats, FIG. 6.

Almost any number of heliostats can be employed. As will be apparent from the consideration of FIGS. 2–4, the heliostats require room for pivoting about their respective axes. Consequently there is required to be a space between the adjacent front row heliostats. The back row heliostats fill in this space such that the sunlight from a large area is reflected onto the respective collector 13 without shadowing by the individual heliostats. While any number of rows of heliostats can be employed, it has been found most advantageous to employ two rows as delineated. As can be seen, there may be employed as many as twelve heliostats in the front row and seven to nine heliostats in the second row to optimize the reflected radiant energy for a given area exposed to the sunlight. Use of greater number of rows of heliostats require that the collector be elevated on a tower structure such as in the prior art, if there is not to be a loss of efficiency.

Each of the respective collectors 13 may comprise a cavity receiver or a simple planar receiver for receiving the reflected energy and converting it to heat for heating a fluid being flowed through a conduit passing through the collector. As illustrated, the respective collectors are substantially planer receivers about 20 feet by 20 feet (6.1 meters by 6.1 meters) heat exchangers with oil being flowed through the conduit to absorb the heat energy from the radiant energy. The collectors are designed to work at temperatures of from 190° F. (87.8° C.) to about 590° F. (293.3° C.). The collectors may be in any desired array. Preferably, the collectors are in line with rear row of heliostats, as illustrated by the collectors 13b-d, FIG. 6. This facilitates placing a central heliostat 37e to reflect between the front row heliostats. If desired, of course, the collectors may be offset from the last row of heliostats; for example, similar to the others illustrated in FIG. 6.

The fluid that is circulated as the working fluid and heat storage medium may be any of the high temperature heat transfer fluids. As illustrated, it is a high temperature heat transfer oil known as Rubilene S315, available from Atlantic Richfield Co. Because of the low pressure, the oil may be heated in a low pressure heat exchanger, rather than high pressure tubing that lowers the thermal efficiency. In this way, collector thermal efficiency at about 500° F. (260° C.) is above 80% (percent). The efficiency is energy into the fluid divided by energy reflected to the receiver, or collector, expressed as percentage.

As can be seen in FIGS. 6 and 7, each of the collectors 13 are serially connected in a fluid circulation conduit, as by conduits 67 intermediate the respective collectors. Connected into the fluid circuit is pump 69, FIG. 7, that takes its suction by line 71 from the bottom of the thermocline tank 73 serving as the fluid storage means. The fluid circuit is also connected by line 75 with the top of the thermocline tank 73 for circulating the heated fluid to the top of the thermocline. For example, the pump 69 may take suction of oil that is only about 195° to 200° F. and put it into the first collector 13a, FIG. 7. As the oil is circulated through each of the collectors 13, it is elevated in temperature by the appropriate increment; for example, about 31 degrees Fahrenheit. Consequently, the oil is able to be returned to the fluid storage means, on the top of the thermocline at a temperature of about 500° F. Suitable temperature sensors T and temperature control valves TCV allow bypassing of the fluid to the lower temperature fluid if desired.

The heat in the heated fluid is employed in a heat exchanger in the steam generator means 79 for generating power to power a prime mover 81 turning a power generator 83. Specifically, the heated fluid is circulated by a pump 85 that is connected at its suction side via line 87 with the top of the thermocline 73. The heat exchanged fluid is returned via line 89 from the steam generator means 79 to the thermocline 73. A hot temperature detector 91 and a cold temperature detector 93 are connected with a temperature differential discharging loop controller 95. The temperature differential loop controller 95 is, in turn, connected with the control valve 97 to control the rate of flow through the heat exchanger 99 interiorly of the steam generator means 79.

Water is fed to the steam generator by a feed water pump 101 that is connected with a source of water. As illustrated, the source of water is from makeup water pump 103 and the condensor 108. Of course, suitable surge tanks can be employed for receiving the water from the condensor 105 and the makeup pump 103.

The water level is maintained at the desired predetermined level in the steam generator means 79 by the water level controller $W_L$ 107, that is operationally connected with the feed water regulator valve 109. The feed water regulator valve 109 is interposed in the conduit 111 connecting the pump 101 with the steam generator means 79 for controlling flow of water responsive to control signals from the controller 107. The steam generator means 79 is connected at its discharge by a conduit 113 with the steam turbine serving as the prime mover 81. The steam turbine 81 discharged by a conduit 115 to the condenser 105. A safety valve 117 is connected to relieve steam to the condenser 105 in the event the pressure becomes too high. A steam bypass valve 119 is also provided for bypassing steam. A steam control valve 121 is interposed in the conduit 113 for controlling the rate of steam flow to the turbine 81. The control valve 121 operates responsively, as indicated by the control line 123, to the load control 125 monitoring the load output from generator 83.

Cooling water is circulated by pump 127 in a fluid circuit including the heat exchanger 129 in the condenser 105 and through the cooling tower 131.

In operation, the respective elements are interconnected as illustrated in the drawings and described hereinbefore. Specifically, the collectors installed on their respective foundations and the respected heliostats are mounted on their respective posts 39 with their respective slots disposed about and encompassing their posts. The respective means for moving the heliostats are interconnected with the suitable gears and pinions meshing, and with the sensors 25 and the cantilevered mounting members 61 then emplaced so as to detect the rays aimed at the collector 13. Thereafter, suitable controls are connected and activated to pivot the heliostat 37 to the desired angle for the sun at any given point. Calibration of the sensors 25 is made.

The oil circulation pump 69 pumps the oil, as the fluid to be heated, through the respective collectors 13 and into the hot portion of the fluid storage means 73. When sufficiently high temperature is obtained, the pump 85 is started to circulate the hot fluid through the steam generator 79. When steam is developed at the desired pressure, it is vented through the steam turbine 81 to power the generator 83. The load controller 125 then controls the steam control valve 121. Boiler makeup water is provided from suitable treated boiler water, as by the pump 103 supplying to the suction side of the fresh water makeup pump 101, either directly or through a surge tank (not shown). Water is made up as needed responsive to the water level controller 107 through the regulator valve 109 to keep the desired water level. The heat exchanged oil is returned through the line 89 to the cool side of the thermocline 73. The cool oil is passed to the suction side of the pump 69 to complete a cycle.

The following information is given on a typical installation. The oil sent to the first collector 13a, may have a temperature of about 195° F. Each subsequent collector 13 then heats it about 31° F. As a consequence of this, in combination with the cooling of about 1° F. experienced in going between the respective serially connected collectors 13, the oil is heated successively to temperatures as follows:

220° F.—from the first one
256° F.—from the second
286° F.—from the third
316° F.—from the fourth
346° F.—from the fifth
376° F.—from the sixth
406° F.—from the seventh
436° F.—from the eighth
466° F.—from the ninth
496° F.—from the tenth
526° F.—from the eleventh
556° F.—from the twelfth The lines for circulating the fluid may be six inch lines for achieving the results delineated to the tables hereinafter. Of course, larger or smaller lines can be employed as appropriate to the size of the installation.

Table I shows the respective elements of the power system and the major perimeters.

TABLE I

| CATEGORY | PARAMETER VALUE |
|---|---|
| RATED POWER-SOLAR | 1 MWe |
| RATED POWER-STORAGE | 1 MWe (24 hours) |
| NO. COLLECTOR MODULES | 12 |
| NO. HELIOSTATS PER MODULE | 19 |
| NO. HELIOSTATS TOTAL | 228 |
| OPTICAL CONFIGURATION HELIOSTAT | FLAT FACET FRESNEL |
| MIRROR AREA PER HELIOSTAT | 416 Ft$^2$ (38.6m$^2$) |
| TOTAL MIRROR AREA | 94,848 Ft.$^2$ (8811m$^2$) |
| LAND USE | 990 × 1200 ft (1.188 × 10$^6$ Ft$^2$) 110,408 m$^2$ 27.3 ACRES |
| RECEIVER TYPE | NORTH FACING-VERTICAL FLAT PLATE |
| NO. RECEIVERS | 12 |
| MAXIMUM RECEIVER UNIT - INPUT | 0.893 MWt |
| MAXIMUM HEAT TO RECEIVERS | 10.714 MWt |
| RECEIVER UNIT AREA | 400 Ft$^2$ (37.1m$^2$) |
| TOTAL RECEIVER AREA | 4800 FT$^2$ (446m$^2$) |
| RECEIVER TEMP. RANGE | 190-560F. (87.8-293° C.) |
| STORAGE TYPE | SENSIBLE HEAT USING HIGH TEMPERATURE OIL (ARCO RUBILENE S 315) |
| NO. TANKS | 1 (THERMOCLINE HOT AND COLD ZONE SEPARATION) |
| TANK DIMENSIONS | 30 ft. (9.14m) DIAMETER 46.2 Ft. (14.08m) HEIGHT 32,640 Ft$^3$ (924m$^3$) VOLUME 244,180 GALLONS (924,309 liters) |
| HOT ZONE TEMP | 550° F. (287.8° C.) |
| COLD ZONE TEMP | 200° F. (93.3° C.) |
| STEAM GENERATOR TYPE | SHELL AND TUBE HEAT EXCHANGER |
| STEAM OUTPUT CONDITIONS | 500° F. (260° C.) SATURATED 680 PSIA (4695 kPa) 120° F. (48.9° C.) CONDENSATE |
| STEAM FLOW | 14,275 Pounds/Hr. (6475 kg/Hr) |
| GROSS TURBINE GENERATOR HEAT RATE | 14.314 Btu/Kw - Hr. (15102 kJ/Kw - Hr) |

MWt - Megawatt, thermal
MWe - Megawatts, electrical
ft - foot
m - Meter
kPa - kilo Pascal
kg - kilogram
hr - hour
Btu - British Thermal Unit
Kw - kilowatt Such a typical solar process steam plant may have the relative cost, efficiencies, and the like as shown in Table II:

TABLE II

| | |
|---|---|
| One Module | 19 Heliostats |
| Power Capacity | 6.52 × 10$^9$ Btu/year |
| Area | 2.75 acres |
| Output | 1190 lbs*/hr steam at 500° F. |
| Efficiency | Approximately 60% at 500° F. |
| Material | Proven long-life second surface mirror glass |
| Energy Cost | Now $8/mm* Btu-Projected $2.67/mm Btu |
| Cost per sq. ft. | Now $22 - Projected $10 |

TABLE II-continued

| System Life | 20 + years |
|---|---|

*lbs - pounds
*mm - million

The collectors are designed to take 90 mile per hour winds. Both the heliostats and collectors are designed to resist adverse effects of weather conditions such as rain, hail, or sandstorms.

From the foregoing, it can be seen that this invention achieves the objects delineated hereinbefore in providing economical, basic sub-combinations and combinations in solar systems in which major nonfunctional expenses for towers and the like are eliminated.

We claim:

1. In a combination employing solar energy, disposed on the surface and exposed to the sun and having:
   a. at least one energy receiving collector for receiving and using radiant energy from the sun; and
   b. at least one reflector means for reflecting said radiant energy from the sun on said collectors:
   the improvement comprising:
   c. having said at least one energy receiving collector comprise a plurality of towerless collectors that are disposed at substantially the same level as respective said reflector means that reflect onto it;
   d. having respective said reflector means comprise a plurality of towerless heliostats that are disposed at substantially the same level as the respective said collector onto which they reflect said radiant energy; said heliostats being moveable to maximize their radiant energy reflected onto said collector; each said heliostat being configured so as to avoid interference with a co-mounted sensor;
   e. a means for moving said heliostat to maximize said radiant energy reflected onto the collector and through arcs that will not interfere with a co-mounted sensor;
   f. a dual purpose support structure carrying said heliostat and a sensor; said support structure being firmly anchored in the surface; and
   g. a sensor controllably connected with said means for moving said heliostat for maintaining the maximum radiant energy reflected onto said collector; said sensor being mounted on said support structure and aligned with a straight line from said heliostat to said collector such that said sensor does not require an expensive, firmly anchored separate support structure to prevent receiving small surface movements different from those received by said heliostat;
   said heliostat having a central reflector; said sensor being cantilevered from said support structure below said central reflector and aligned between the center of said central reflector and said collector; said heliostat having a slot below said central reflector so as to be pivotal through an arc without hitting said support structure, said sensor and said cantilevered mountings; said heliostat being pivotally movable about a horizontal axis through said central reflector; said means moving said heliostat including an elevation drive means for pivoting said heliostat to a desired angle about said horizontal axis; said heliostat being rotatable about a vertical axis through said central reflector and said means for moving said heliostat including a rotation means for rotating said heliostat through a limited arc about said vertical axis.

2. A combination for utilizing solar energy comprising:
   a. power generating means for generating power; said power generating means including a steam powered prime mover;
   b. steam generating means for generating steam; said steam generating means being connected with said power generating means for passing steam therethrough; said steam generating means including a heat exchange means for converting water into steam when passed in heat exchange relationship with a heated fluid;
   c. water feed means for feeding water to said steam generating means; said water feed means being connected with said steam generating means and with a source of liquid water.
   d. fluid storage means for storing said heated fluid and the heat exchanged return fluid after it has been passed in heat exchanged relationship with said water to produce said steam;
   e. first hot fluid circulating means for circulating said heated fluid in heat exchange relationship with said water in said steam generating means; said first hot fluid circulating means being fluidly connected with said fluid storage means and said steam generating means in a fluid circuit so as to circulate said heated fluid to said steam generating means from said fluid storage means for said heated fluid, and to return the heat exchange fluid from said steam generating means to said fluid storage means for the heat exchanged return fluid;
   f. a plurality of solar collectors for collecting radiant energy heat and using it to heat said fluid; said solar collectors being connected together in series such that the temperature of said fluid is raised progressively higher as it passes through respective said collectors unti a desired temperature above the boiling point of water at the pressure in said steam generating means is reached; said collectors being towerless collectors that are disposed at substantially the same level as their respective heliostats;
   g. second fluid circulation means for circulating said heat exchanged fluid through said series connected collectors; said second fluid circulating means being fluidly connected in a circuit with said fluid storage means and said collector so as to circulate said heat exchange return fluid through said collectors and back to the fluid storage means for said heated fluid; and
   h. a plurality of heliostats for each said collector; said heliostats being movable to maximize reflected radiant energy impinging on its respective said collector; said heliostats being towerless heliostats that are disposed at substantially the same level as their respective collectors.

3. The combination of claim 2 wherein each said collector has its said heliostats arranged in two rows, a first row being nearest to said collector and a second row being displaced from said first row and with individual heliostats displaced so as to reflect between individual heliostats in said first row and onto said collector.

4. The combination of claim 3 wherein each said heliostat is configured so as to avoid interference with a comounted sensor; means is provided for moving said heliostat to maximize said radiant energy reflected onto said collector and through arcs that will not interfere with a co-mounted sensor; there are provided dual purpose support structures carrying respective said heliostats and sensors; said support structure being anchored firmly in the surface; and respective sensors are controllably connected with the means for moving the heliostats for maintaining the maximum radiant energy reflected onto the respective collector; said sensors being mounted on respective said support structure and aligned with a straight line from respective said heliostats to respective said collector such that said sensor does not require an expensive, firmly anchored separate support structure to prevent receiving small surface movements different from those received by said heliostat.

5. The combination of claim 4 wherein each said heliostat has a central reflector; said sensor is cantilevered from said support structure below said central reflector and aligned between the center of said central reflector and said collector; said heliostat has a slot below said central reflector so as to be pivotal through an arc without hitting said support structure, said sensor and cantilevered mountings; said heliostat is pivotally movable about a horizontal axis through said central reflector; said means for moving said heliostat includes an elevation drive means for pivoting said heliostat to a desired angle about said horizontal axis; said heliostat is rotatable by the vertical axis through said central reflector and said means removing said heliostat includes a rotation means for rotating said heliostat through a limited arc about said vertical axis.

* * * * *